US008364626B2

(12) United States Patent
Heilmann et al.

(10) Patent No.: US 8,364,626 B2
(45) Date of Patent: Jan. 29, 2013

(54) METHOD AND DEVICE FOR DETERMINING A PROBABILITY OF OCCURRENCE BY EVALUTING AN OVERALL FAULT TREE

(75) Inventors: Reiner Heilmann, Egmating (DE); Manfred Lohner, München (DE); Stefan Rothbauer, Allershausen (DE); Ariane Sutor, Gräfelfing (DE)

(73) Assignee: Siemens Aktiengesellschaft, Munich (DE)

( * ) Notice: Subject to any disclaimer, the term of this patent is extended or adjusted under 35 U.S.C. 154(b) by 499 days.

(21) Appl. No.: 12/677,886

(22) PCT Filed: Jul. 29, 2008

(86) PCT No.: PCT/EP2008/059913
§ 371 (c)(1),
(2), (4) Date: Mar. 12, 2010

(87) PCT Pub. No.: WO2009/037042
PCT Pub. Date: Mar. 26, 2009

(65) Prior Publication Data
US 2010/0223500 A1    Sep. 2, 2010

(30) Foreign Application Priority Data

Sep. 14, 2007   (DE) .................. 10 2007 043 871

(51) Int. Cl.
*G06F 17/00* (2006.01)
*G06N 5/02* (2006.01)
(52) U.S. Cl. ........................................... 706/47
(58) Field of Classification Search ............... None
See application file for complete search history.

(56) References Cited

U.S. PATENT DOCUMENTS

| 2005/0015217 A1* | 1/2005 | Weidl et al. ............. 702/185 |
| 2005/0043922 A1 | 2/2005 | Weidl et al. ............. 702/183 |
| 2005/0160324 A1 | 7/2005 | Przytula et al. ........... 714/43 |

(Continued)

FOREIGN PATENT DOCUMENTS

| DE | 102004007053 | 9/2005 |
| WO | 0109724 | 2/2001 |

(Continued)

OTHER PUBLICATIONS

Sahner et al. "Sharpe: Symbolic Hierarchical Automated Reliability and Performance Evaluation", 1992, pp. 76, http://sharpe.pratt.duke.edu/files/sharpe/download/sharpe_userguide.pdf.*

(Continued)

*Primary Examiner* — Jeffrey A Gaffin
*Assistant Examiner* — Li-Wu Chang
(74) *Attorney, Agent, or Firm* — King & Spalding L.L.P.

(57) ABSTRACT

IN a method and a device for determining a probability of occurrence that an overall system fulfills a predefined system performance, the overall system is composed of instances of different classes of partial systems, and each class of partial systems has an associated class fault tree. The method has the following steps: (a) calculating (S1) an overall performance for each failure combination of the number of non-failed instances within a class; (b) automatic selection (S2) of failure combinations, the calculated overall performance of which fulfills the predefined system performance; (c) automatic generation (S3) of an overall fault tree based on the class fault trees of partial systems as a function of the selected failure combinations; and (d) evaluating (S4) of the generated overall fault tree for calculating the probability of occurrence of a fulfillment of the predefined system performance by the overall system.

20 Claims, 6 Drawing Sheets

U.S. PATENT DOCUMENTS

2009/0106593 A1* 4/2009 Bluvband et al. ............... 714/37
2011/0137703 A1* 6/2011 Dugan et al. ................. 705/7.28

FOREIGN PATENT DOCUMENTS

| WO | 03042918 | 5/2003 |
| WO | 2007086823 | 8/2007 |

OTHER PUBLICATIONS

Cepin et al. "A Dynamic Fault Tree", RESS 75, 2002, pp. 83-91.*
International Search Report and Written Opinion for Application No. PCT/EP2008/059913 (12 pages), Dec. 1, 2009.

* cited by examiner

FIG 2

Class A: $A_0, A_1$   $n_A = 2$
Class B: $B_0, B_1, B_2$   $n_B = 3$

| Combination No. | Number of non-failed instances of class A | Number of non-failed instances of class B | System performance fullfillment |
|---|---|---|---|
| 1 | 0 | 0 | no |
| 2 | 0 | 1 | no |
| 3 | 0 | 2 | yes |
| 4 | 0 | 3 | yes |
| 5 | 1 | 0 | no |
| 6 | 1 | 1 | yes |
| 7 | 1 | 2 | yes |
| 8 | 1 | 3 | yes |
| 9 | 2 | 0 | no |
| 10 | 2 | 1 | yes |
| 11 | 2 | 2 | yes |
| 12 | 2 | 3 | yes |

FIG 4

| Brake system type No. | Number of different single brakes in this system | Contribution of single subsystem to brake force |
|---|---|---|
| 1 | 4 | 10 % |
| 2 | 5 | 5 % |
| 3 | 5 | 7 % |

FIG 5

| Functioning partial systems | | | Brake force |
|---|---|---|---|
| Type 1 | Type 2 | Type 3 | |
| 0 | 3 | 5 | 50 % |
| 1 | 1 | 5 | 50 % |
| 3 | 4 | 0 | 50 % |
| 4 | 2 | 0 | 50 % |

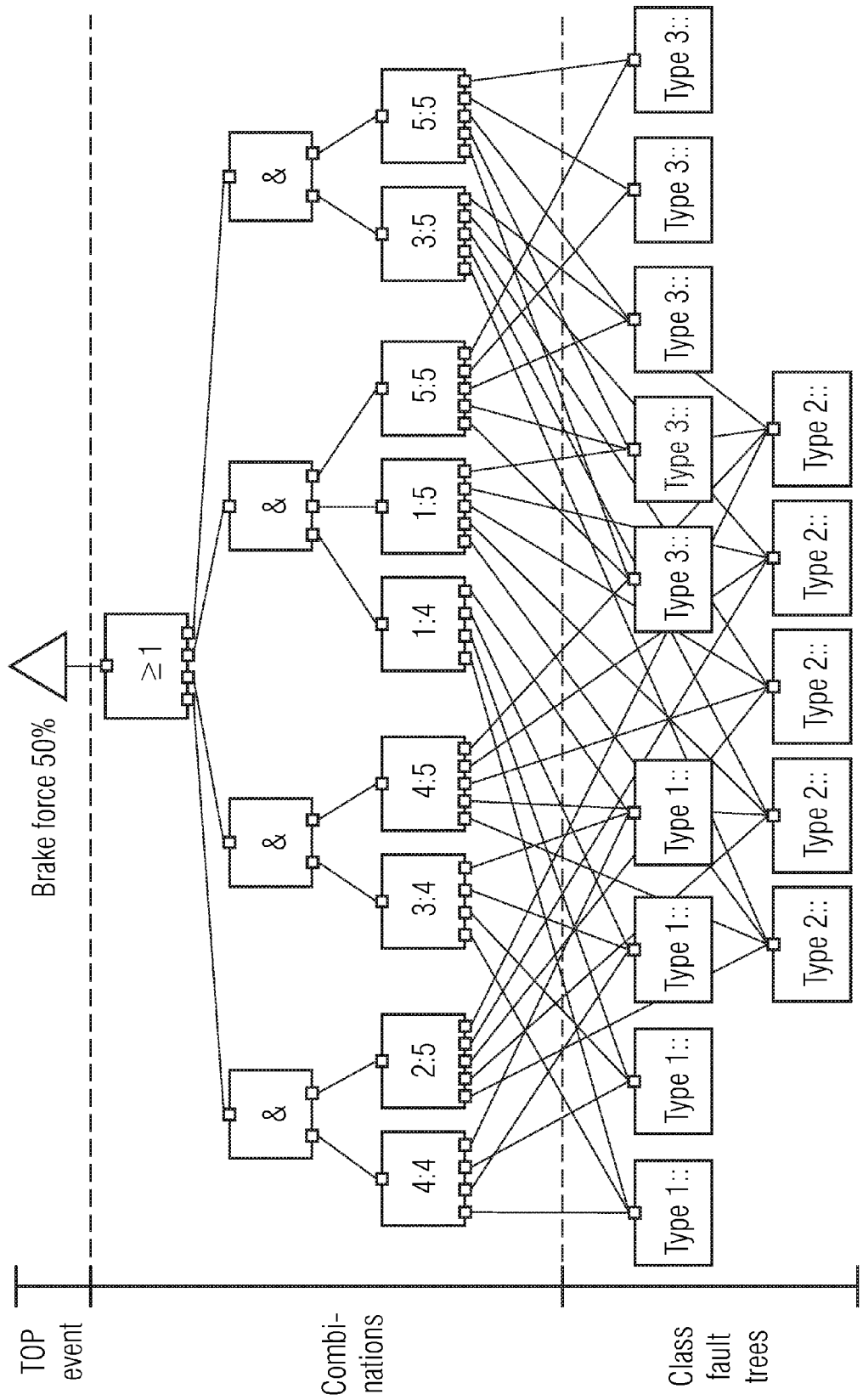

METHOD AND DEVICE FOR DETERMINING A PROBABILITY OF OCCURRENCE BY EVALUTING AN OVERALL FAULT TREE

CROSS-REFERENCE TO RELATED APPLICATIONS

This application is a U.S. National Stage Application of International Application No. PCT/EP2008/059913 filed Jul. 29, 2008, which designates the United States of America, and claims priority to German Application No. 10 2007 043 871.2 filed Sep. 14, 2007, the contents of which are hereby incorporated by reference in their entirety.

TECHNICAL FIELD

The invention relates to a method and device for determining a probability of occurrence that an overall system fulfills a predefined system performance.

BACKGROUND

An example of such an overall system is a train braking system featuring brakes of different types.

Embedded systems are increasingly being used which are safety-critical and are networked with other functions. The increasing range of functions as well as the increasing networking of functions require quality assurance measures that increase the reliability and the safety of the technical systems. These measures typically include fault analysis and fault detection. In such cases test methods, statistical analysis methods and fault analysis methods are used. The quantitative analysis of fault scenarios is highly rated, especially in safety systems.

An example of a safety-critical overall system is a train braking system which is also made up of a number of subsystems or part systems featuring brakes of different brake types. To obtain approval for trains and to furnish proof that the overall technical system satisfies specific technical and availability requirements, it is necessary to determine the probability of occurrence which specifies whether the overall braking system fulfills a predefined system performance, for example, whether the aggregated braking force of all brakes is sufficient for all scenarios

SUMMARY

According to various embodiments, a method and a device for determining a probability of occurrence can be created which specifies whether a complex overall system fulfills a predefined system performance.

According to an embodiment, a method for determining a probability of occurrence (W) that an overall system fulfills a predefined system performance, wherein the overall system is composed of instances of different classes of partial systems and wherein each class of partial system has an associated class fault tree, has the steps:
(a) Calculating (S1) an overall performance for each failure combination of non-failed instances within a class;
(b) Automatic selection (S2) of failure combinations, the calculated overall performance of which fulfills the predefined system performance;
(c) Automatic generation (S3) of an overall fault tree based on the class fault trees of partial systems as a function of the selected failure combinations; and (d) Evaluation (S4) of the generated overall fault tree for calculating the probability of occurrence of a fulfillment of the predefined system performance by the overall system. According to a further embodiment, failure combinations can be selected of which the overall performance is greater than a threshold value able to be set for the system performance of the overall performance. According to a further embodiment, failure combinations can be selected of which the overall performance is less than a threshold value able to be set for the system performance of the overall performance. According to a further embodiment, each class fault tree may have logical combination elements for logical linkage of events. According to a further embodiment, each class fault tree may logically link a number of primary events to an associated output event. According to a further embodiment, the output events generated by the class fault trees of all instances of the different classes of partial systems can be logically linked by a generated combinational logic of the overall fault tree into a top event. According to a further embodiment, the top event can be formed by the system performance of the overall system. According to a further embodiment, the combinational logic of the overall fault tree may have NOOM logical combination elements, AND logical combination elements and OR logical combination elements. According to a further embodiment, an output event may occur at an output of an NOOM (N out of M) logical combination element if at least N out of M possible input events occur at inputs of the NOOM logical combination element. According to a further embodiment, the class fault trees of the classes of partial systems can be intermeshed or non-intermeshed. According to a further embodiment, each class of a partial system may have a performance. According to a further embodiment, the overall performance of a failure combination of non-failed instances of a class of a partial system can be formed by the sum of all performances of the non-failed instances. According to a further embodiment, a class of a partial system can be formed by a brake type. According to a further embodiment, each brake type may have the associated brake force as its performance. According to a further embodiment, the overall system can be formed from a brake system composed of a number of brakes of different brake types. According to a further embodiment, the system performance of the overall system can be formed by an aggregated brake force of all brakes of brake system.

According to another embodiment, a device for determining a probability of occurrence that an overall system fulfills a predefined system performance, wherein the overall system is composed of instances of different classes of partial systems, and wherein each class of partial system has an associated class fault tree, may comprise:
(a) A unit for calculating an overall performance for each failure combination of the number of non-failed instances within a class;
(b) A unit for automatic selection of failure combinations, the calculated performance of which fulfills the predefined system performance in each case;
(c) A unit for automatic generation of an overall fault tree based on the class fault trees of partial systems depending in the selected failure combinations; and with
(d) A unit for evaluation of the generated overall fault tree for calculating the probability of occurrence of the system performance being fulfilled by the overall system.

According to a further embodiment of the device, the overall system being formed from a brake system composed of a number of brakes of different brake types.

According to yet another embodiment, a computer program may carry out the method as described above.

According to yet another embodiment, a data carrier may store the computer program as described above.

BRIEF DESCRIPTION OF THE DRAWINGS

Embodiments of the method and of the device are explained below with reference to the enclosed figures to explain their features.

The Figures show:

FIG. 2 a table to show a simple example for explaining the functioning of the method;

FIG. 4 a concrete example of a train brake system as an overall system for explaining the functioning of the method;

FIG. 5 a table to show different combination options which fulfill a predefined system performance for the example specified in the table in accordance with FIG. 4;

FIG. 7 an example for an overall fault tree based on the class fault trees in accordance with FIG. 6.

DETAILED DESCRIPTION

Figure 1:
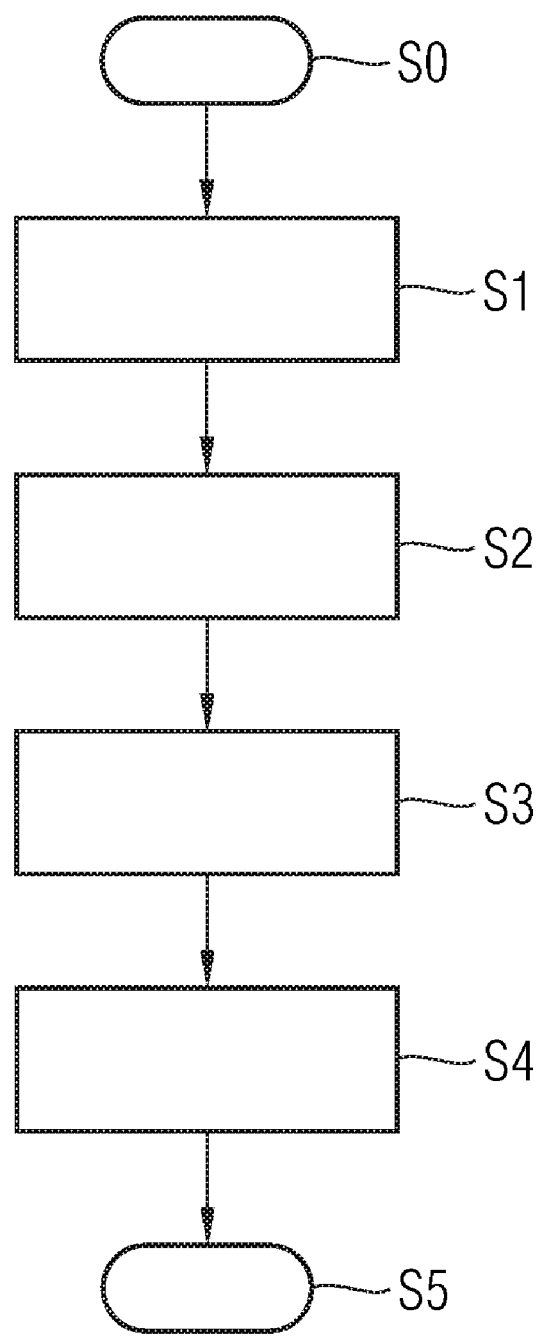
FIG. 1 a flowchart to show an exemplary embodiment of the method for determining a probability of occurrence.

According to various embodiments, a method determines a probability of occurrence that an overall system fulfills a predefined system performance, wherein the overall system is composed of instances of different classes of subsystems, and each class of partial system has an associated class fault tree. The method may have the following steps:

(a) Calculating (S1) an overall performance for each failure combination of the number of non-failed instances within a class;
(b) Automatic selection (S2) of failure combinations, the calculated failure performance of which fulfills the predefined system performance;
(c) Automatic generation (S3) of an overall fault tree based on the class fault trees of partial systems as a function of the selected failure combinations; and
(d) Evaluation (S4) of the generated overall fault tree for calculating the probability of occurrence that an overall system fulfills a predefined system performance.

In one embodiment of the method failure combinations are selected of which the overall performance is higher than a selectable threshold value for the system performance of the overall system.

In an alternate embodiment of the method failure combinations are selected of which the overall performance is lower than a selectable threshold value for the system performance of the overall system.

In one embodiment of the method each class fault tree features logical operator elements for logical linkage of events.

In one embodiment of the method each class fault tree logically links a number of primary events to form an associated output event.

In one embodiment of the method the output events created by the class fault trees of all instances of the different classes of partial system are logically linked by a generated combinational logic of the overall fault tree to form a top event.

In an embodiment of the method the top event is formed by the system performance of the overall system.

In one embodiment of the method the combinational logic of the overall fault tree has logical NOOM combination elements, logical AND combination elements or logical OR combination elements.

In one embodiment of the method an output event occurs at an output of an NOOM (N out of M) logical combination element if at least N or M possible input events occur at inputs of the NOOM logical combination element.

In one embodiment of the method the class fault trees of the classes of partial system are intermeshed and non-intermeshed.

In one embodiment of the method each class of a partial system exhibits a performance.

In one embodiment of the method the overall performance of a failure combination of non-failed instances of a partial system is formed by the sum of all performances of the non-failed instances.

In one embodiment of the method a class of a partial system is formed by a brake type.

In one embodiment of the method each brake type has an associated brake force as performance.

In one embodiment of the method the overall system is formed by a brake system that consists of a number of brakes of different brake types.

In one embodiment of the method the system performance of the overall system is formed by an aggregated brake force of all brakes of the brake system.

According to other embodiments, a device for determining a probability of occurrence that an overall system fulfills a predefined system performance can be created, wherein the overall system is composed of instances of different classes of partial system and each class of partial system has an associated class fault tree, with:

(a) A unit for calculating an overall performance for each failure combination of the number of non-failed instances within a class;
(b) A unit for automatic selection of failure combinations, the calculated performance of which fulfills the predefined system performance in each case;
(c) A unit for automatic generation of an overall fault tree based on the class fault trees of partial systems depending in the selected failure combinations; and with
(d) A unit for evaluating the generated overall fault tree for calculating the probability of occurrence of the system performance being fulfilled by the overall system.

As used herein, each "unit" may include one or more processors and/or other suitable hardware for executing computer program instructions to perform the respective functions of that unit.

In one embodiment of the device the overall system is formed by a brake composed of brakes of different brake types.

According to yet further embodiments, a computer program can be created for carrying out the method as described above.

According to yet another embodiment, a data medium for storing the computer program can be created.

The method according to an embodiment for determining a probability of occurrence W features a number of steps, as can be seen from FIG. 1. The method according to an embodiment determines a probability of occurrence that the overall system fulfills a predefined system performance.

An overall system involves a complex system which is composed of instances of different classes of partial systems. The overall system typically involves a train brake system of a train. The train brake system contains a number of partial systems, such as individual brakes of different brake types.

Each brake type forms a brake class. Each brake type class is instantiated by instances, i.e. real brakes. Each class of partial systems, for example each class of brakes, has an associated class fault tree. Each class fault tree contains different logical combination elements for logically combining events. A class fault tree logically combines input or primary events into an associated output event. The logical combination elements of a class fault tree contain logical AND or logical OR gates for example. A class fault tree can be created for example with a model editor of a fault tree tool with a graphical editor interface.

In a first step S1 of the method according to an embodiment, as shown in FIG. 1, an overall performance for each failure combination of the number of non-failed instances within a class is computed. FIG. 2 shows a simple example to explain the method according to an embodiment. In the example shown in FIG. 2 the overall system has two different types or two different classes of subsystems or partial systems, namely class A and class B. In this case two subsystems or two partial systems of class A and three subsystems or partial systems of class B are used in the overall system. The number $N_A$ of systems of class A used in the overall system amounts to $n_A=2$ The number $N_B$ of systems of class B used in the overall system amounts to $n_B=3$.

Each subsystem or partial system is instantiated by a real unit, for example a manufactured brake of the respective brake type. The two classes A and B typically involve different brake types of a train brake system. In the simple example shown in the table depicted in FIG. 2, the brake system of the train contains two brakes of type or class A and three brakes of type or class B. The two brakes of class A are labeled A0, A1 and the three brakes of class B are labeled B0, B1, B2. Overall the train brake system contains five brakes, namely A0, A1, B0, B1, B2. There can for example be a different number of brakes in each class of brake. For example there can be no brakes, one brake or both brakes of the two brakes of brake type A or of class A in the class. The failure possibilities for each brake type or each brake class thus amount to n+1, with n being the number of instances of the respective class within the overall system.

The total number of combinations is produced from the product of the failure possibilities across all classes present:

$$Z = \prod_{i=1}^{N} (n_i + 1),$$

with N being the number of the classes present in the overall system.

In the simple example shown in FIG. 2, the number of combinations amounts to $Z=(2+1)\times(3+1)=3\times4=12$.

Each instance of a class exhibits an associated performance. Each class of brake or each brake type exhibits an associated brake force. For example a brake of class A exhibits a brake force of 100M, while a brake of class B exhibits a brake force of 200N. In accordance with the table shown in FIG. 2 an overall performance for each failure combination of the number of non-failed instances within the class is computed from this. If for example the predefined system performance SP, as from which the overall system or the train brake system is capable of functioning, is 250N, the computed overall performance and the different failure combinations emerge from the following table:

| Combination-NO | Brake force of all non-failed brakes of class A | Brake force of all non-failed brakes of class B | Sum of overall brake force in Newton N | SP fulfilled 0 = no 1 = yes |
|---|---|---|---|---|
| 1 | 0 N | 0 N | 0 N | 0 |
| 2 | 0 N | 200 N | 200 N | 0 |
| 3 | 0 N | 400 N | 400 N | 1 |
| 4 | 0 N | 600 N | 600 N | 1 |
| 5 | 100 N | 0 N | 100 N | 0 |
| 6 | 100 N | 200 N | 300 N | 1 |
| 7 | 100 N | 200 N | 300 N | 1 |
| 8 | 100 N | 600 N | 700 N | 0 |
| 9 | 200 N | 0 N | 400 N | 1 |
| 10 | 200 N | 200 N | 400 N | 1 |
| 11 | 200 N | 400 N | 600 N | 1 |
| 12 | 200 N | 600 N | 800 N | 1 |

As can be seen from the above table, the maximum brake force of the overall system is produced for failure combination No. 12, i.e. neither a brake of class A nor of class B has failed, a full braking force is available. If for example a system performance SP of 250N is required, combinations No. 1, 2, 5, 9 do not fulfill this system performance of the overall system, while the other combinations, i.e. the combinations 3, 4, 6, 7, 8, 10, 11, 12 exhibit an overall system performance which lies above the given threshold value of 250N and thus fulfills the required system performance.

In step S2 of the flowchart of the method according to an embodiment shown in FIG. 1 for those failure combinations their respective overall performance, for example their brake force, is compared with the predefined system performance SP of the system. If the predefined system performance amounts to 250N for example, the result specified in the above table for fulfilling the system performance SP is obtained for the different failure combinations. In step S2 those failure combinations are selected of which the computed overall performance satisfies the predefined system performance SP. According to Table 1 these are combinations 3, 4, 6, 7, 8, 10, 11, 12.

In a possible embodiment of the method not all failure combinations of which the overall performance lies above a predetermined threshold of for example 250N are selected, but only those of which the overall performance lies close to the threshold value. If it is established for example that the combination with the number 3 with a total brake force of 400N lies above the predefined threshold value of 250N, in a possible embodiment of the method the failure combination with combination No. 4 will not be selected. Combination no. 3 specifies that the system performance is already sufficient if two brakes of class B each with 200N have not failed or are functioning correctly. Consequently a combination in which yet more brakes of class B are functioning correctly, for example three brakes of class B in accordance with combination No. 4 is likewise sufficient to satisfy the required system performance SP. In this optimized method, in the specified example in accordance with the above table, only the combinations with the combination number 3, 6, 10 are selected in step S2.

Figure 3:
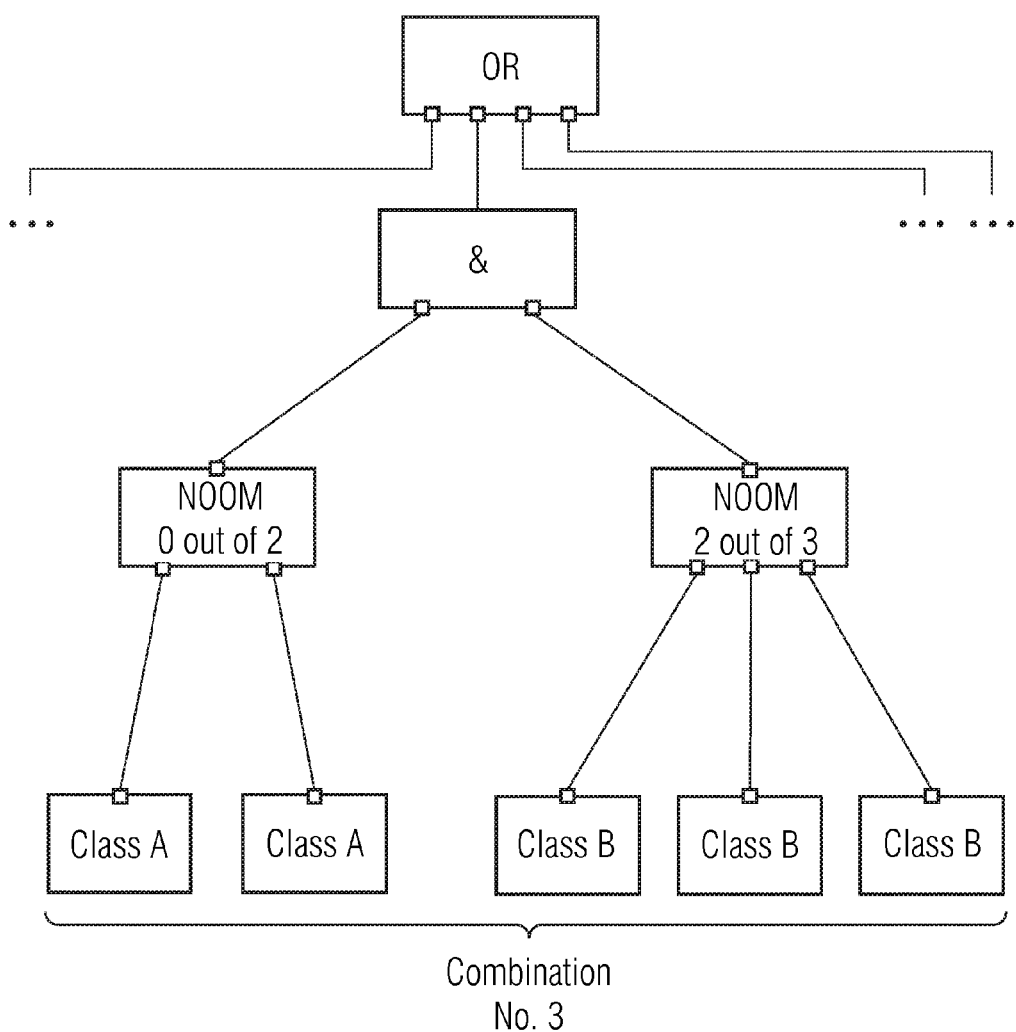
FIG. 3 a section from an overall fault tree for a failure combination contained in the table shown in FIG. 2.

In a further step S3 an overall fault tree based on the class fault trees of the partial systems is generated automatically as a function of the selected failure combinations. FIG. 3 shows a section from a generated overall fault tress for failure combination no. 3 in accordance with FIG. 2 and the above table. Combination no. 3 fulfills the required system performance since it exhibits an overall brake force of 400N which lies above the required threshold of 250N. Failure combination No. 3 has zero brakes as its number of non-failed instances of class A, i.e. all brakes of class A have failed and thus deliver a brake force of ON. Accordingly the two class fault trees of class A ($n_A=2$) are logically linked with a NOOM (0 out of 2) logical combination element. The NOOM logical combination element (N out of M) receives a logically high value at its output or an output event occurs at the output of the NOOM logical combination element if at least N of M possible input events occur at inputs of the NOOM logical combination element. The output of the NOOM logical combination element is connected to an input of an AND logical combination element. The class fault tree, for example of class A, logically links primary events to an associated output event. The two output events of the two class fault trees for class A shown in FIG. 3 are logically linked to inputs of the NOOM (0 out of 2) logical combination element.

Failure combination No. 3 in accordance with FIG. 2 and the above table shows a value of two as the number of the non-failed instances of class B. This means that the number of non-failed brakes of class B amounts to two or one of the three possible brakes of class B has failed. The two non-failed brakes of class B deliver a brake force of 2×200N=400N and thus likewise fulfill the system performance SP of the overall brake system. As shown in FIG. 3, the three class fault tress for the three brakes of class B ($n_B=3$) will be linked with a NOOM logical combination element (2 out of 3), of which the output for its part is linked to an input of the AND logical combination element. If an output event occurs at the outputs of the two NOOM logical combination elements, the AND gate or AND logical combination element outputs a logically high value to an OR logical combination element, the output of which forms the top event. The top event is formed by the system performance SP of the overall system. The diagram shown in FIG. 3 depicts a section of the overall fault tree formed. For each failure combination of which the overall performance fulfills the required system performance SP of the system, the logical linkage is as shown in FIG. 3.

In a further step S4 of the method the generated overall fault tree is evaluated to calculate the probability of occurrence that the overall system fulfills the predefined system performance. The method ends with step S5. In the example shown in FIG. 2, 3 those failure combinations of which the overall performance is greater than a selectable threshold value are selected.

In an alternate embodiment failure combinations can also be selected of which the overall performance is less than a selectable threshold value for the system performance SP of the overall system.

From the combinations of the numbers of possible failures, those failures are selected in each class which respectively exceed or do not reach the predefined system performance.

If the combinations are only differentiated by the number of failures of the same class in each case, it is sufficient to select the combination with the minimum number of possible failures.

An overall fault tree is generated which is composed of the selected combinations of the fault tress of the partial systems.

The evaluation of the overall fault tree delivers as a result the probability that the system exceeds or does not reach the predefined system performance.

A further option consists of defining the combinations for the success function (E) instead of for the failure function (V) depending on which quantity is less powerful, and determining the probability of the desired event by means of the relationship $p(V)=1-p(E)$.

FIG. 4 shows a table for depicting a further exemplary embodiment of the method. In this exemplary embodiment an overall system in the form of a train brake system has three different types of brake, namely brakes of type number 1, 2, 3. The number of the different individual brakes of the different types for the overall brake system amounts to four brakes of brake type No. 1 and five brakes of brake type No. 2. 3. The contribution of a subsystem to the overall brake force or an overall performance of the system amounts in the selected example for a brake of brake type No. 1 to 10%, for a brake of brake type No. 2 to 5% and for a brake of brake type No. 3 to 7%.

The number of possible combinations amounts to: $Z=(4+1)\times(5+1)\times(5+1)=5\times6\times6=180$ possible combinations.

An analysis of the possible combinations of which the aggregated brake force delivers 50% of the required brake power produces the combinations shown in the table according to FIG. 5. For example a combination in which no non-failed brakes of type 1 are present, in which 3 non-failed brakes of brake type 2 are present and in which five non-failed brakes of type 3 are present produces a brake force of 0×10%+3×5%+5×7%=50%.

Figure 6:
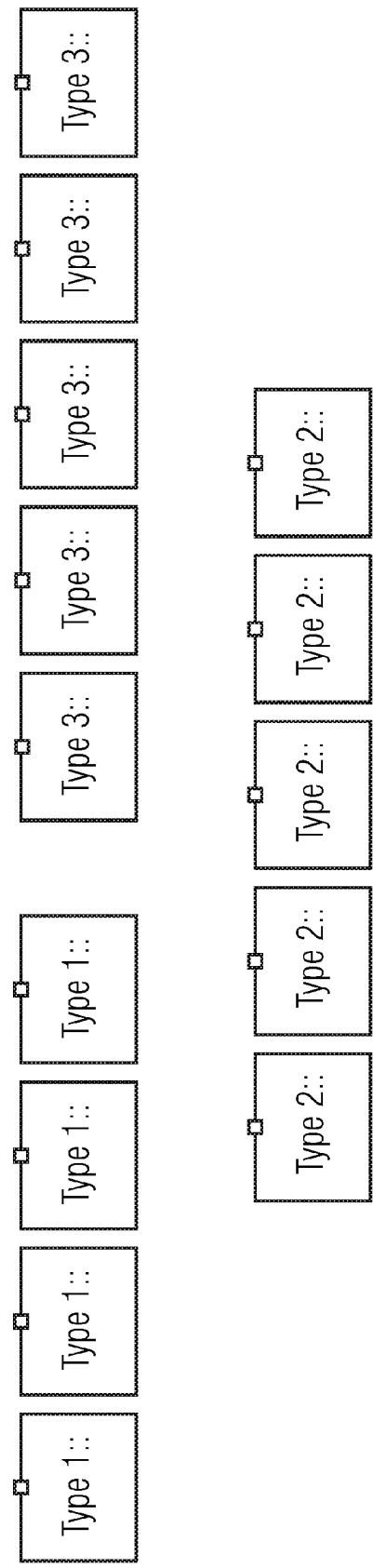
FIG. 6 a diagram for modeling an overall brake system composed of different brake types from class fault tress for the example specified in FIG. 4.

Another combination of the 180 possible combinations, namely a combination in which a brake of type 1 is functioning, in which a brake of type 2 is functioning and in which the five brakes of type 3 are functioning, produces a brake force of 1×10%+1×5%+5×7%, i.e. likewise 50% brake force. FIG. 6 shows the example specified in FIG. 5 of associated class fault trees for the three different classes or three different types of brakes respectively. The number of different single brakes of type 1 in the train brake system amounts to four, the number of single brakes of type 2 or of class 2 amounts to five, the number of single brakes of type 3 or of class 3 likewise amounts to five. Accordingly four class fault trees of type 1, 5 class fault trees of type 2 and five class fault trees of type 3 are provided or edited.

Based on the class fault trees shown in FIG. 4 of the different classes or types of brake, and overall fault tree is generated as is shown in FIG. 7.

The generated overall fault tree contains three areas. The class fault trees, of which the outputs are connected to inputs of NOOM gates or NOOM logical combination elements, form the basis of the overall fault tree. The outputs of the NOOM logical combination elements are connected to inputs of AND logical combination elements, of which the outputs for their part are connected to inputs of a common OR gate or OR logical combination element. The NOOM logical combination elements, the AND logical combination elements or the logical combination elements together form a generated combinational logic. A probability of occurrence that the overall system fulfils a predefined system performance is calculated for the top event of the generated overall fault tree, as is shown for example in FIG. 7. For example it can emerge from the computation that the probability of occurrence that the overall brake force of the brake system will fall below 50% is less than $10^{-7}$ and is thus small enough for the associated train brake system to be allowed.

In a possible embodiment of the method fault trees are generated with a fault tree software tool such as UWG3 for example and are described with XML. All relevant combinations are created with the aid of a program and the corresponding overall fault tree generated.

A dummy code for an exemplary embodiment of the method is specified below:

```
//dummy code the generation of the combinational logic of
the overall fault tree
main ( )
    {
        read partialsystemfaulttree;
        read partialsystemperformance;
        read limit;
        // The number of classes is known in advance and does not change
        // Therefore there is one loop for each class
        // First test which combinations will be used
        for(iA = 0; iA <= number in class A; iA++)
        {
            for(iB = 0; iB <= number in class B; iB++)
            {
                ....
                    ....
                        for(iLAST = 0; iLAST <= number in class LAST; iLAST++)
                        {
                            // iA is the current number of functioning partial systems from class A
                            // iB is the current number of functioning partial systems from class B
                            ...
                            ...
                            // iLAST is the current number of functioning partial systems from class LAST
                            achieved_performance = function_of(iA, iB,..., iLAST);
                            if(achieved_performance >= threshold)
                            {
                                // Now we have one possible candidate
                                // Now we check whether we can find a better candidate
                                achieved performance = function of(iA-1, iB,..., iLAST);
                                if(achieved performance >= threshold)
                                {
                                    // We actually manage less well with a partial system of class A
                                    // This candidate is thus superfluous
                                    continue;
                                }
                                achieved performance = function of(iA, iB-1,..., iLAST);
                                if(achieved performance >= threshold)
                                {
                                    // We actually manage less well with a partial system of class B
                                    // This candidate is thus superfluous
                                    continue;
                                }
                                ...
                                ...
                                achieved performance = function of(iA, iB,..., iLAST-1);
                                if(achieved performance >= threshold)
                                {
                                    // We actually manage less well with a partial system of class LAST
                                    // This candidate is thus superfluous
                                    continue;
                                }
                                // A candidate which has made it this far is accepted
                                mark this candidate ( );
                            }
                        }
                    ....
                ....
            }
        }
    }
Create the fault tree with candidate marked above( )
// Now we have the fault tree sought with the top event
"achieved performance >= threshold" and can
// have this fault tree evaluated by UWG3.
// We then obtain the probability for the top event.
}
```

With the method according to an embodiment it is possible, for complex technical systems, for example brake systems, to determine reliable characteristic values for safety and availability. Determining the probability of occurrence that the overall system fulfils a predefined system performance is automated in the method according to an embodiment.

The method according to an embodiment is especially suitable for highly-complex systems with a very large number of failure combinations of subsystems of different classes. The method according to an embodiment can be used for any technical system, for example technical installations. For example the method according to an embodiment can be used analysis of production systems or computer systems or networks respectively.

What is claimed is:

1. A method for determining a probability of occurrence that an overall system fulfills a predefined system performance, wherein the overall system is composed of instances of different classes of partial systems and wherein each class of partial system has an associated class fault tree, the method comprising:
   (a) Calculating an overall performance for each failure combination of non-failed instances within a class;
   (b) Automatic selection of failure combinations, the calculated overall performance of which fulfills the predefined system performance, wherein the overall performance of a failure combination of non-failed instances of a class of a partial system being formed by a function of all performances of each non-failed instance of the non-failed instances;
   (c) Automatic generation of an overall fault tree based on the class fault trees of partial systems as a logical combination of the selected failure combinations; and
   (d) Evaluation of the generated overall fault tree for calculating the probability of occurrence of a fulfillment of the predefined system performance by the overall system.

2. The method according to claim 1, wherein failure combinations being selected of which the overall performance is greater than a threshold value able to be set for the system performance of the overall performance.

3. The method according to claim 1, wherein failure combinations being selected of which the overall performance is less than a threshold value able to be set for the system performance of the overall performance.

4. The method according to claim 2, wherein each class fault tree having logical combination elements for logical linkage of events.

5. The method according to claim 4, wherein each class fault tree logically linking a number of primary events to an associated output event.

6. The method according to claim 5, wherein the output events generated by the class fault trees of all instances of the different classes of partial systems being logically linked by a generated combinational logic of the overall fault tree into a top event.

7. The method according to claim 6, wherein the top event being formed by the system performance of the overall system.

8. The method according to claim 7, wherein the combinational logic of the overall fault tree having N-Out-Of-M (NOOM) logical combination elements, AND logical combination elements and OR logical combination elements.

9. The method according to claim 8, wherein an output event occurring at an output of an N-Out-Of-M (NOOM) logical combination element if at least N out of M possible input events occur at inputs of the NOOM logical combination element.

10. The method according to claim 1, wherein each class of a partial system having a performance.

11. The method according to claim 10, wherein the class fault trees of the classes of partial systems being intermeshed or non-intermeshed.

12. The method according to claim 1, wherein the overall performance of a failure combination of non-failed instances of a class of a partial system being formed by the sum of all performances of the non-failed instances.

13. The method according to claim 1, wherein a class of a partial system being formed by a brake type.

14. The method according to claim 13, wherein each brake type having the associated brake force as its performance.

15. The method according to claim 14, wherein the overall system being formed from a brake system composed of a number of brakes of different brake types.

16. The method according to claim 15, wherein the system performance of the overall system being formed by an aggregated brake force of all brakes of brake system.

17. A device for determining a probability of occurrence that an overall system fulfills a predefined system performance, wherein the overall system is composed of instances of different classes of partial systems, and wherein each class of partial system has an associated class fault tree, comprising:
   one or more processors programmed to:
   calculate an overall performance for each failure combination of the number of non-failed instances within a class;
   select failure combinations, the calculated performance of which fulfills the predefined system performance in each case, wherein the overall performance of a failure combination of non-failed instances of a class of a partial system being formed by a function of all performances of each non-failed instance of the non-failed instances;
   generate an overall fault tree based on the class fault trees of partial systems as a logical combination of the selected failure combinations; and with
   evaluate the generated overall fault tree for calculating the probability of occurrence of the system performance being fulfilled by the overall system.

18. The device according to claim 17, wherein the overall system being formed from a brake system composed of a number of brakes of different brake types.

19. A computer program product stored in non-transitory computer-readable media and comprising instructions stored on a computer-readable medium which when executed on a processor perform the steps of:
   (a) Calculating an overall performance for each failure combination of non-failed instances within a class;
   (b) Automatic selection of failure combinations, the calculated overall performance of which fulfills the predefined system performance, wherein the overall performance of a failure combination of non-failed instances of a class of a partial system being formed by a function of all performances of each non-failed instance of the non-failed instances;
   (c) Automatic generation of an overall fault tree based on the class fault trees of partial systems as a logical combination of the selected failure combinations; and
   (d) Evaluation of the generated overall fault tree for calculating the probability of occurrence of a fulfillment of the predefined system performance by the overall system.

20. The computer program product according to claim 19, wherein failure combinations being selected of which the overall performance is greater than a threshold value able to be set for the system performance of the overall performance.

* * * * *

UNITED STATES PATENT AND TRADEMARK OFFICE
CERTIFICATE OF CORRECTION

| | | |
|---|---|---|
| PATENT NO. | : 8,364,626 B2 | Page 1 of 1 |
| APPLICATION NO. | : 12/677886 | |
| DATED | : January 29, 2013 | |
| INVENTOR(S) | : Reiner Heilmann et al. | |

It is certified that error appears in the above-identified patent and that said Letters Patent is hereby corrected as shown below:

Cover page item (54) and col. 1, line 1, Title, "METHOD AND DEVICE FOR DETERMINING A PROBABILITY OF OCCURRENCE BY EVALUATING AN OVERALL FAULT TREE" should read -- METHOD AND DEVICE FOR DETERMINING A PROBABILITY OF OCCURRENCE --.

Signed and Sealed this
Twenty-sixth Day of March, 2013

Teresa Stanek Rea
*Acting Director of the United States Patent and Trademark Office*